(12) United States Patent
Matsubara

(10) Patent No.: US 12,704,617 B2
(45) Date of Patent: Aug. 11, 2026

(54) DRIVE DEVICE, ULTRASONIC SENSOR AND VEHICLE

(71) Applicant: ROHM CO., LTD., Kyoto (JP)

(72) Inventor: Hideki Matsubara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 259 days.

(21) Appl. No.: 18/507,448

(22) Filed: Nov. 13, 2023

(65) Prior Publication Data

US 2024/0159886 A1 May 16, 2024

(30) Foreign Application Priority Data

Nov. 16, 2022 (JP) ................................ 2022-183119

(51) Int. Cl.
*G01S 7/524* (2006.01)
*G01S 15/931* (2020.01)

(52) U.S. Cl.
CPC ............ *G01S 7/524* (2013.01); *G01S 15/931* (2013.01)

(58) Field of Classification Search
CPC ..... G01S 7/524; G01S 15/931; B06B 1/0215; B06B 2201/55; G01H 11/08
See application file for complete search history.

(56) References Cited

U.S. PATENT DOCUMENTS 4,275,363 A * 6/1981 Mishiro .................... H03L 7/12 318/116
4,659,014 A * 4/1987 Soth ...................... B05B 17/063 310/317
7,855,609 B2 * 12/2010 Amemiya .......... H03K 17/6872 310/318
10,921,445 B2 * 2/2021 Bariant ................. G01S 15/104
2008/0066552 A1 * 3/2008 Amemiya .......... H03K 17/6872 73/602
2016/0023021 A1 * 1/2016 Liu ................ A61B 17/320068 606/169
2019/0056495 A1 * 2/2019 Bariant .................. G01S 7/524

FOREIGN PATENT DOCUMENTS

EP 2848961 A1 * 3/2015 ............ G01S 15/10
JP 2018096752 6/2018
WO WO 2020004609 1/2020

* cited by examiner

*Primary Examiner* — Abdallah Abulaban
*Assistant Examiner* — Amie M Ndure
(74) *Attorney, Agent, or Firm* — Fish & Richardson P.C.

(57) ABSTRACT

The present disclosure provides a drive device. The drive device includes a burst generating circuit and a drive circuit. The burst generating circuit is configured to generate a burst signal. The drive circuit is configured to generate a pulse drive signal based on the burst signal and supply the pulse drive signal to a target-driving element. The pulse drive signal includes a first signal having a self-wave identification frequency and a second signal having a frequency other than the self-wave identification frequency.

10 Claims, 5 Drawing Sheets

DRIVE DEVICE, ULTRASONIC SENSOR AND VEHICLE

TECHNICAL FIELD

The present disclosure relates to a drive device for driving a target-driving element, an ultrasonic sensor having the drive device, and a vehicle having the ultrasonic sensor.

BACKGROUND

Conventionally, there are ultrasonic sensors which, by means of generating ultrasonic waves, measure time-of-flight (TOF) until a reflected wave from an obstacle returns and hence measure a distance from the obstacle. Such ultrasonic sensors are mostly mounted in vehicles, and are, for example, in-vehicle clearance sonars.

For example, the ultrasonic sensor disclosed by Patent Publication 1 regards an intrinsic frequency modulation scheme of a product as a feature of a self-wave and identifies the self-wave. Since the ultrasonic sensor that identifies the self-wave can distinguish between ultrasonic waves sent from other ultrasonic sensors and reflected waves sent from its own ultrasonic sensor and reflected by an object, it can reduce distance detection errors.

For example, the ultrasonic sensor disclosed by Patent Publication 2 includes a drive circuit (a transmitting unit that uses a piezoelectric element to transmit output signals in an ultrasonic domain) for driving a piezoelectric element. The drive circuit uses a voltage supplied from a power supply circuit as a power supply voltage and operates accordingly.

PRIOR ART DOCUMENT

[Patent Publication]

[Patent publication 1] International Publication No. 2020/004609 (paragraphs [0105] to [0118])

[Patent publication 2] Japan Patent Publication No. 2018-96752

DETAILED DESCRIPTION OF THE EMBODIMENTS

First Embodiment

In an example, it is assumed that an ultrasonic sensor of the first embodiment is mounted in a vehicle and can be used to measure a distance between the vehicle and a target object for the use of an alarm function, an auto-brake function and an auto-parking function.

Figure 1:
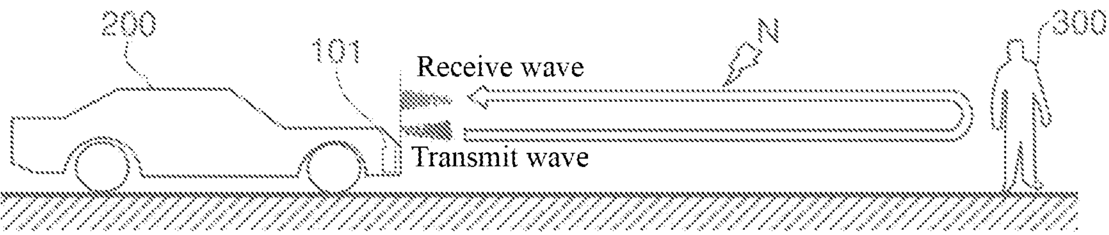
FIG. 1 is a schematic diagram of a vehicle mounted with an ultrasonic sensor according to a first embodiment and a target object.

FIG. 1 shows a vehicle 200 mounted with an ultrasonic sensor 101 (hereinafter referred to as "ultrasonic sensor 101") according to the first embodiment and a target object (obstacle) 300. An ultrasonic wave sent from the ultrasonic sensor 101 is reflected by the target object 300, and becomes a reflected wave that is received by the ultrasonic sensor 101. At this point in time, the ultrasonic sensor 101 also receives an ambient noise N. The ambient noise N includes, for example, ultrasonic waves sent by ultrasonic sensors other than the ultrasonic sensor 101.

Thus, in the ultrasonic sensor 101, if the reflected wave, that is, a self-wave, is not correctly distinguished from the ambient noise N, the ultrasonic sensor 101 may incorrectly detect a distance to the target object 300.

Figure 2:
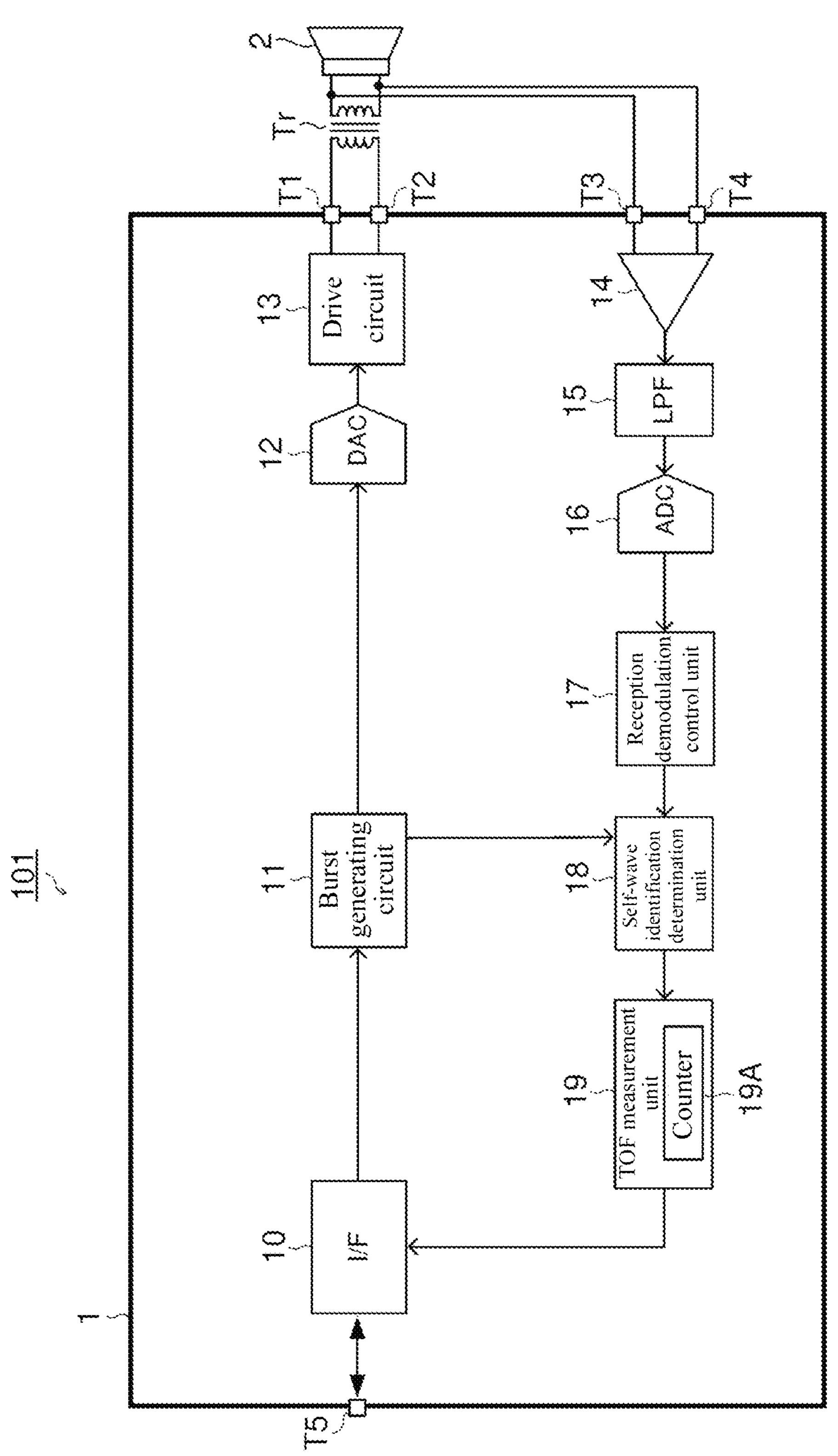
FIG. 2 is a diagram of a configuration of an ultrasonic sensor according to the first embodiment.

Next, the ultrasonic sensor 101 is described below. FIG. 2 shows a diagram of a configuration of the ultrasonic sensor 101.

The ultrasonic sensor 101 includes a signal processing device 1, a transformer Tr and an ultrasonic transceiving device 2. The ultrasonic transceiving device 2 is externally connected to the signal processing device 1 through the transformer Tr. Moreover, the transformer Tr can be selectively provided. When the transformer Tr is not provided, a power supply circuit that supplies a power supply voltage to a drive circuit 13 described later is then configured to include a boost circuit, as that in a second embodiment described below.

The signal processing device 1 is a semiconductor integrated circuit device. The signal processing device 1 is a drive circuit that drives a piezoelectric element disposed in the ultrasonic transceiving device 2.

The signal processing device 1 includes an interface 10, a burst generating circuit 11, a digital-to-analog converter (DAC) 12, the drive circuit 13, a low-noise amplifier (LNA) 14, a low-pass filter (LPF) 15, an analog-to-digital converter (ADC) 16, a reception demodulation control unit 17, a self-wave identification determination unit 18, a time-of-flight (TOF) measurement unit 19, and external terminals T1 to T5.

For example, the interface 10 communicates with an electronic control unit (ECU, not shown) mounted in the vehicle 200 (referring to FIG. 1) through the external terminal T5 according to a Local Interconnect Network (LIN).

The interface 10 receives a transmission command transmitted from the ECU and then transmits the transmission command to the burst generating circuit 11.

The burst generating circuit 11 determines a frequency modulation mode, and generates a burst signal having the determined frequency modulation mode. The burst generating circuit 11 determines the frequency modulation mode based on, for example, pseudo-random numbers. Moreover, the burst generating circuit 11 outputs information of the determined frequency modulation mode to the self-wave identification determination unit 18.

The frequency modulation mode is, for example, a frequency shift keying (FSK) modulation mode that sets a first half of a burst signal to a first frequency and sets a second half of the burst signal to a second frequency different from the first frequency, a chirp modulation mode that linearly increases a frequency in a first half of a burst signal and linearly decreases the frequency in a second half of the burst signal, and a chirp modulation mode that linearly decreases a frequency in a first half of a burst signal and linearly increases the frequency in a second half of the burst signal.

The DAC 12 digital-to-analog converts a burst signal output from the burst generating circuit 11 from a digital signal to an analog signal, and outputs the digital-to-analog converted burst signal to the drive circuit 13.

Output terminals of a differential pair of the drive circuit 13 are connected to a primary side of the transformer Tr through the external terminals T1 and T2. The ultrasonic transceiving device 2 is connected to a secondary side of the transformer Tr. The drive circuit 13 generates a pulse drive signal based on the digital-to-analog converted burst signal, and supplies the pulse drive signal to the piezoelectric element disposed in the ultrasonic transceiving device 2 through the external terminals T1 and T2 and the transformer Tr.

The ultrasonic transceiving device 2 includes the piezoelectric element (not shown) to transmit and receive ultrasonic waves. That is to say, the ultrasonic transceiving device 2 functions as both an acoustic source and a receiving unit. The ultrasonic transceiving device 2 can be configured to include a piezoelectric element used exclusively for transmission and a piezoelectric element used exclusively for reception, or can be configured to include a piezoelectric element that is shared for transmission and reception.

Input terminals of a differential pair of the LNA 14 are connected to the secondary side of the transformer Tr through the external terminals T3 and T4. An output signal of the LNA 14 is supplied to the ADC 16 through the LPF 15. The ADC 16 analog-to-digital converts the output signal of the LNA 14 from an analog signal to a digital signal, and outputs the analog-to-digital converted signal to the reception demodulation control unit 17.

The reception demodulation control unit 17 demodulates frequency modulation information included in a received signal by performing such as fast Fourier transform (FFT) processing for the received signal.

The self-wave identification determination unit 18 identifies a self-wave based on the information of the frequency modulation mode determined by the burst generating circuit 11 and the information demodulated by the reception demodulation control unit 17. More specifically, if a similarity degree between the information of the frequency modulation mode determined by the burst generating circuit 11 and the information demodulated by the reception demodulation control unit 17 is more than a predetermined level, the self-wave identification determination unit 18 detects a reflected wave (self-wave) sent.

The TOF measurement unit 19 uses a counter 19A to measure a TOF from when the ultrasonic wave is sent to when the reflected wave reflected by the target object 300 (referring to FIG. 1) is received.

The TOF measurement unit 19 starts a count value of the counter 19A from a timing at which the ECU transmits the transmission command to the signal processing device 1.

The TOF measurement unit 19 maintains the count value of the counter 19A for the timing while the self-wave is detected by the self-wave identification determination unit 18. The count value maintained by the TOF measurement unit 19 corresponds to the TOF, and a distance to the target object can be specified by means of the TOF and a speed at which the ultrasonic waves are transmitted from the ultrasonic transceiving device. The count value maintained by the TOF measurement unit 19 is transmitted to the ECU through the interface 10.

In this embodiment, the burst drive signal includes a first signal having a self-wave identification frequency and a second signal having a frequency other than the self-wave identification frequency. By making use of the second signal having a frequency other than the self-wave identification frequency, a tracking ability of a drive frequency for a target-driving element to follow a frequency of a pulse drive signal can be enhanced.

Thus, it is desired that the number of pulses of the second signal is less than the number of pulses of the first signal. By having the number of pulses of the second signal be less than the number of pulses of the first signal, a length of the pulse drive signal can be prevented from any unnecessary increase.

During a period in which a first operation example is performed, the drive circuit 13, when the frequency of the pulse drive signal is switched from a first frequency to a second frequency higher than the first frequency, switches from the first frequency to the second frequency after passing through a third frequency higher than the second frequency, and sets the frequency of the second signal to the third frequency.

For example, when the burst generating circuit 11 generates a burst signal in the FSK modulation mode that sets 32 waves (32 pulses) of the first half of the burst signal to 50 kHz and 32 waves (32 pulses) of the second half of the burst signal to 51.5 kHz, the burst generating circuit 11 generates a burst signal including 4 waves (4 pulses) in 54 kHz between the 32 waves (32 pulses) of the first half and the 32 waves (32 pulses) of the second half.

During a period in which a second operation example is performed, the drive circuit 13, when the frequency of the pulse drive signal is switched from a fourth frequency to a fifth frequency lower than the fourth frequency, switches from the fourth frequency to the fifth frequency after passing through a sixth frequency lower than the fifth frequency, and sets the frequency of the second signal to the sixth frequency.

For example, when the burst generating circuit 11 generates a burst signal in the FSK modulation mode that sets 32 waves (32 pulses) of the first half of the burst signal to 51.5 kHz and 32 waves (32 pulses) of the second half of the burst signal to 50 kHz, the burst generating circuit 11 generates a burst signal including 4 waves (4 pulses) in 49 kHz between the 32 waves (32 pulses) of the first half and the 32 waves (32 pulses) of the second half.

During a period in which a third operation example is performed, the drive circuit 13 sets a preliminary drive period for the piezoelectric element disposed in the ultrasonic transceiving device 2 before a drive period of the piezoelectric element disposed in the ultrasonic transceiving device 2, and renders the frequency of the pulse drive signal at a beginning of the drive period to be different from the frequency of the pulse drive signal during the preliminary drive period, wherein the frequency of the second signal is set to the frequency of the pulse drive signal during the preliminary drive period.

For example, when the burst generating circuit 11 generates a burst signal having 64 waves (64 pulses) in a chirp modulation mode that linearly increases a frequency from 51 kHz to 53 kHz, the burst generating circuit 11 generates a burst signal having 64 waves (64 pulses) in which the frequency linearly increases from 51 kHz to 53 kHz after 4 waves (4 pulses) in 49 kHz.

Moreover, specific examples of the drive circuit 13 when the first operation example and the third operation example are performed are described as below. For example, when the burst generating circuit 11 generates a burst signal in a FSK modulation mode that sets 32 waves (32 pulses) of a first half of the burst signal to 50 kHz and 32 waves (32 pulses) of a second half of the burst signal to 53 kHz, the burst generating circuit 11 generates a burst signal including 4 waves (4 pulses) in 49 kHz before the 32 waves (32 pulses) of the first half and includes 4 waves (4 pulses) in 55 kHz between the 32 waves (32 pulses) of the first half and the 32 waves (32 pulses) of the second half.

Second Embodiment

Figure 3:
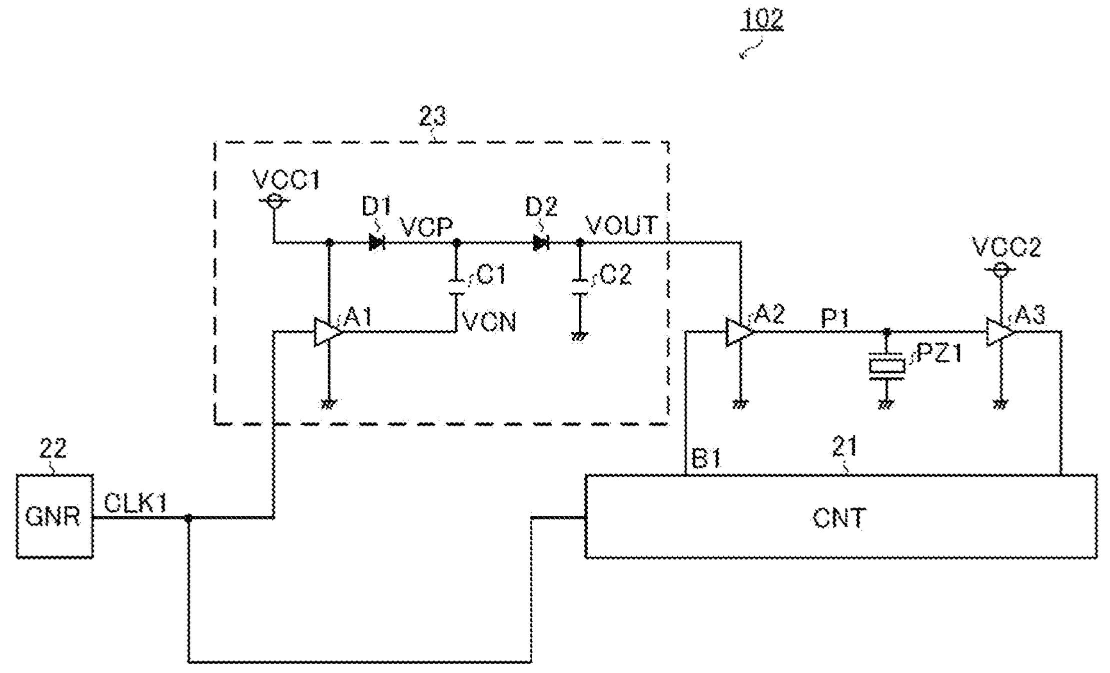
FIG. 3 is a diagram of a configuration of an ultrasonic sensor according to a second embodiment.

FIG. 3 shows a diagram of a brief configuration of an ultrasonic sensor 102 (hereinafter referred to as "ultrasonic sensor 102") according to a second embodiment. The ultrasonic sensor 102 shown in FIG. 3 includes a control circuit 21, a clock signal generating unit 22, a power supply circuit 23, a drive circuit A2, a piezoelectric element PA1 and a receiving circuit A3. The ultrasonic sensor 102 senses a distance to a measurement target object. The control circuit 21, the clock signal generating unit 22, the power supply circuit 23 and the drive circuit A2 form a drive device that drives the piezoelectric element PZ1.

The control circuit 21 controls the drive circuit A2 based on a clock signal CLK1 output from the clock signal generating unit 22. The control circuit 21 includes a burst generating circuit configured to generate a burst signal B1. The control circuit 21 processes an output signal of the receiving circuit A3, and calculates the distance to the measurement target object.

The clock signal generating unit 22 generates the clock signal CLK1 having a predetermined frequency.

The power supply circuit 23 switches a switching element based on the clock signal CLK1 output from the clock signal generating unit 22, and accordingly generates an output voltage VOUT.

The power supply circuit 23 is a charge pump circuit including an amplifier A1 that amplifies a clock signal, a diode D1 which is the switching element, a flying capacitor C1, a diode D2 and a capacitor C2. The clock signal is supplied to an input terminal of the amplifier A1. An output terminal of the amplifier A1 is connected to a negative electrode of the flying capacitor C1.

A first constant voltage VCC1 is applied to an anode of the diode D1 and a power supply terminal of the amplifier A1. A ground terminal of the amplifier A1 is connected to a ground potential.

A cathode of the diode D1 is connected to a positive electrode of the flying capacitor C1 and an anode of the diode D2. A cathode of the diode D2 is connected to a positive electrode of the capacitor C2. A negative electrode of the capacitor C2 is connected to a ground potential. A positive electrode voltage of the capacitor C2 becomes an output voltage VOUT of the power supply circuit 23.

The drive circuit A2 uses a voltage supplied from the power supply circuit 23 as a power supply voltage. The drive circuit A2 is configured to generate a pulse drive signal P1 based on the burst signal B1, and supply the pulse drive signal P1 to the piezoelectric element PZ1. More specifically, the drive circuit A2 is an amplifier that amplifies the burst signal B1. The control circuit 21 outputs the burst signal B1 to the drive circuit A2 during a transmission operation of the ultrasonic sensor 102, and outputs a constant low-level signal to the drive circuit A2 during a reception operation of the ultrasonic sensor 102. The drive circuit A2 causes the piezoelectric element PZ1 to vibrate within an ultrasonic domain.

The burst signal B1 is supplied to an input terminal of the drive circuit A2. An output terminal of the drive circuit A2 is connected to a first end of the piezoelectric element PZ1 and an input terminal of the receiving circuit A3. The output voltage VOUT of the power supply circuit 23 is applied to a power supply terminal of the drive circuit A2. A ground terminal of the drive circuit A2 and a second end of the piezoelectric element PZ1 are connected to a ground potential.

The receiving circuit A3 uses a second constant voltage VCC2 as a power supply voltage. The receiving circuit A3 receives an output signal of the piezoelectric element PZ1. More specifically, the receiving circuit A3 is an amplifier that amplifies the output signal of the piezoelectric element PZ1. The output signal of the piezoelectric element PZ1 is supplied to an input terminal of the receiving circuit A3. An output signal of the receiving circuit A3 is supplied to the control circuit 21. The second constant voltage VCC2 is applied to a power supply terminal of the receiving circuit A3. A ground terminal of the receiving circuit A3 is connected to a ground potential.

The burst generating circuit disposed in the control circuit 21 varies a duty (duty ratio) of the burst signal B1 according to at least one of a temporal position of a drive period of the piezoelectric element PZ1 and a frequency of the burst signal B1. Accordingly, non-uniformity of an output level (an acoustic voltage generated by vibration of the piezoelectric element PZ1) of the piezoelectric element PZ1 can be inhibited.

In a first control example of the control circuit 21, the burst generating circuit disposed in the control circuit 21 varies the duty of the burst signal B1 according to the temporal position of the drive period of the piezoelectric element PZ1, such that the duty of the burst signal B1 when the temporal position of the drive period of the piezoelectric element PZ1 is a first position is smaller than the duty of the burst signal B1 when the temporal position of the drive period of the piezoelectric element PZ1 is a second position subsequent to the first position.

Figure 4:
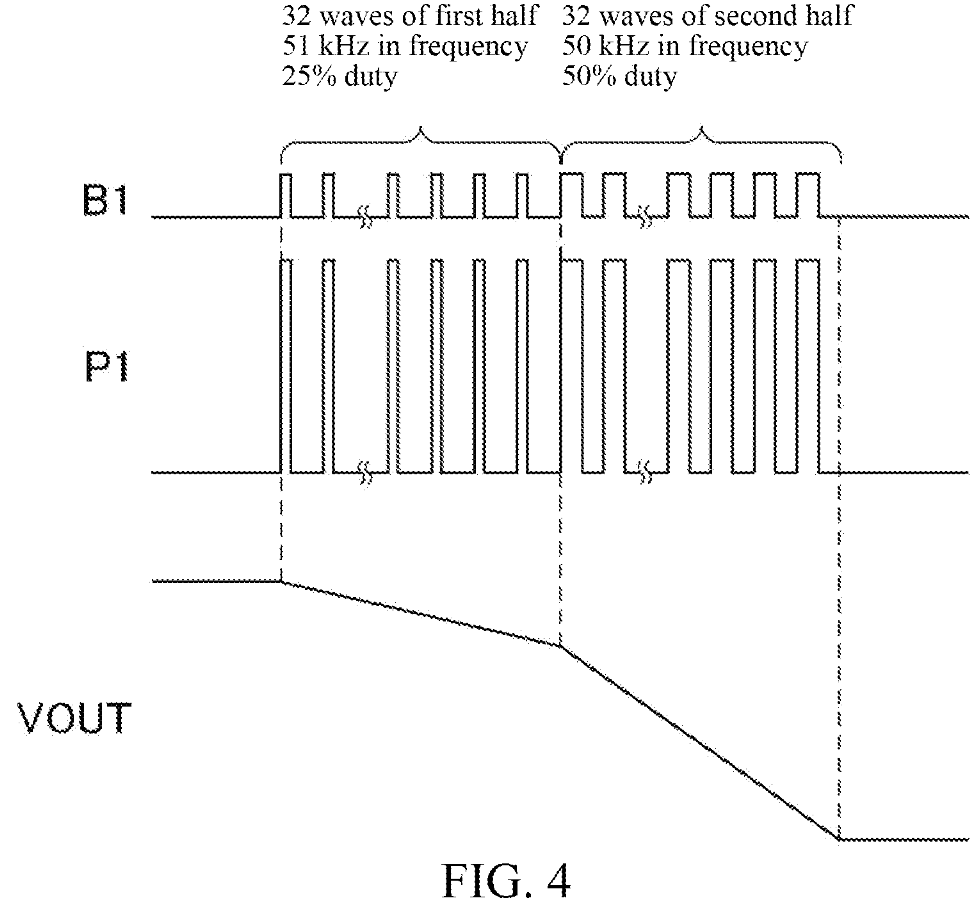
FIG. 4 is an exemplary timing diagram of signal waveforms when a control circuit performs a first control example.

FIG. 4 shows an exemplary timing diagram of signal waveforms when a control circuit 21 performs the first control example. In the example shown in FIG. 4, the duty of the burst signal B1 when the temporal position of the drive period of the piezoelectric element PZ1 is the first position (corresponding to a temporal position of 32 waves (32 pulses) of the first half of the burst signal B1) is set to 25%, and the duty of the burst signal B1 when the temporal position of the drive period of the piezoelectric element PZ1 is the second position (corresponding to a temporal position of 32 waves (32 pulses) of the second half of the burst signal B1) is set to 50%.

By reducing the duty of the burst signal B1 when the temporal position of the drive period of the piezoelectric element PZ1 is the first position, consumption of energy stored in the capacitor C2 when the temporal position of the drive period of the piezoelectric element PZ1 is the first position can be inhibited. Accordingly, reduction in the output voltage VOUT when the temporal position of the drive period of the piezoelectric element PZ1 is the first position can be inhibited. As a result, when the temporal position of the drive period of the piezoelectric element PZ1 is the first position and when the temporal position of the drive period of the piezoelectric element PZ1 is the second position, a difference generated in the output level (the acoustic voltage generated by vibration of the piezoelectric element PZ1) of the piezoelectric element PZ1 can be inhibited.

In the example shown in FIG. 4, the control circuit 21 causes varying in the frequency of the burst signal B1 of the frequency modulation performed for identifying the self-wave to be synchronous with the varying of the duty of the burst signal B1. Accordingly, frequency control and duty control of the burst signal B1 can be simplified. Moreover, since a change in a current flowing through the piezoelectric element PZ1 before and after switching the driving frequency (vibration frequency) of the piezoelectric element PZ1 can be inhibited, switching of the driving frequency (vibration frequency) of the piezoelectric element PZ1 can be accelerated.

However, the varying of the frequency of the burst signal B1 is not necessarily synchronous with the varying of the duty of the burst signal B1. In addition, the varying in the duty of the burst signal B1 is not limited to being in two stages, but can be three or more stages.

In a second control example of the control circuit 21, the pulse generating circuit disposed in the control circuit 21 varies the duty of the burst signal B1 according to the frequency of the burst signal, and the duty of the burst signal B1 when the frequency of the burst signal B1 is the first frequency is smaller than the duty of the burst signal B1 when the frequency of the burst signal B1 is the second frequency. An impedance of the piezoelectric element PZ1 when the frequency of the burst signal B1 is the first frequency is lower than the impedance of the piezoelectric element PZ1 when the frequency of the burst signal B1 is the second frequency.

Figure 5:
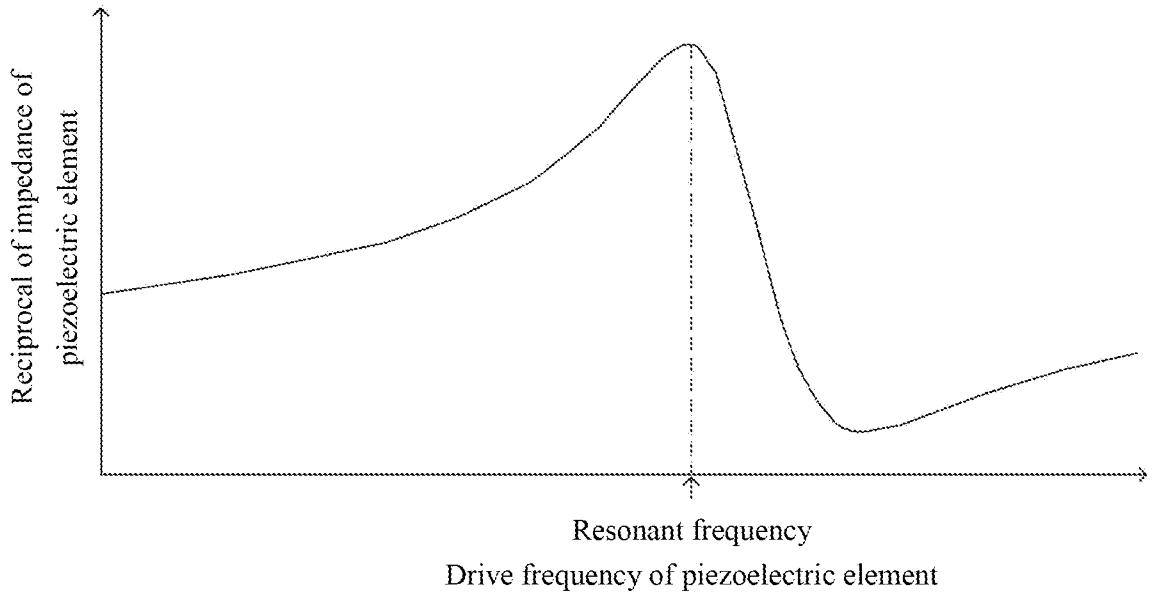
FIG. 5 is a diagram of a frequency characteristic of an impedance of a piezoelectric element.

As shown in FIG. 5, the impedance of the piezoelectric element PZ1 is the lowest at a resonant frequency.

When the impedance of the piezoelectric element PZ1 is low, a current flowing through the piezoelectric element PZ1 increases, consumption of the energy stored in the capacitor C2 increases, and the output level (acoustic voltage generated by vibration of the piezoelectric element PZ1) of the piezoelectric element PZ1 increases.

On the other hand, when the impedance of the piezoelectric element PZ1 is high, the current flowing through the piezoelectric element PZ1 decreases, consumption of the energy stored in the capacitor C2 decreases, and the output level (acoustic voltage generated by vibration of the piezoelectric element PZ1) of the piezoelectric element PZ1 decreases.

Accordingly, with the second control example performed by the control circuit 21, during the varying of the frequency of the burst signal B1, a difference generated in the output level (the acoustic voltage generated by vibration of the piezoelectric element PZ1) of the piezoelectric element PZ1 can be inhibited. Moreover, since a change in a current flowing through the piezoelectric element PZ1 before and after switching the driving frequency (vibration frequency) of the piezoelectric element PZ1 can be inhibited, switching of the driving frequency (vibration frequency) of the piezoelectric element PZ1 can be accelerated.

<Other>

Various modifications may be made to the embodiments of the disclosure within the scope of the technical concept of the claims. The various embodiments so far provided in the description may be appropriately implemented in combination given that no contradictions are incurred. The embodiments above are only examples of possible implementations of the present disclosure, and the meanings of the terms of the present disclosure or the constituents are not limited to the description of the embodiments above.

For example, in the first embodiment, the drive circuit 13 performs driving by means of differential driving; however, the drive circuit 13 can also perform driving by means of single-ended driving.

For example, in the second embodiment, the drive circuit A2 performs driving by means of single-ended driving; however, the drive circuit A2 can also perform driving by means of differential driving.

For example, the target-driving element driven by the drive device may be also an element other than a piezoelectric element.

<Notes>

A note is attached to the disclosure to show specific configuration examples of the embodiments above.

According to an aspect of the present disclosure, a drive device (1) is configured as (a first configuration), comprising:

- a burst generating circuit (11), configured to generate a burst signal; and
- a drive circuit (13), configured to generate a pulse drive signal based on the burst signal and supply the pulse drive signal to a target-driving element (2),
- wherein the pulse drive signal includes a first signal having a self-wave identification frequency and a second signal having a frequency other than the self-wave identification frequency.

The drive circuit of the first configuration can also be configured as (a second configuration), wherein the drive circuit is configured to, when the frequency of the pulse drive signal is switched from a first frequency to a second frequency higher than the first frequency, switch from the first frequency to the second frequency after passing through a third frequency higher than the second frequency, and the frequency of the second signal is the third frequency.

The drive circuit of the first or second configuration can also be configured as (a third configuration), wherein the drive circuit is configured to, when the frequency of the pulse drive signal is switched from a fourth frequency to a fifth frequency lower than the fourth frequency, switch from the fourth frequency to the fifth frequency after passing through a sixth frequency lower than the fifth frequency, and the frequency of the second signal is the sixth frequency.

The drive circuit of any one of the first to third configurations can also be configured as (a fourth configuration), wherein the drive circuit is configured to set a preliminary drive period for the target-driving element before a drive period of the target-driving element, and render the frequency of the pulse drive signal at a beginning of the drive period to be different from the frequency of the pulse drive signal during the preliminary drive period, wherein the frequency of the second signal is the frequency of the pulse drive signal during the preliminary drive period.

The drive circuit of any one of the first to fourth configurations can also be configured as (a fifth configuration), wherein a number of pulses of the second signal is less than a number of pulses of the first signal.

The drive circuit of any one of the first to fifth configurations can also be configured as (a sixth configuration), further comprising a power supply circuit (23), wherein the drive circuit uses a voltage supplied from the power supply circuit as a power supply voltage, and the burst generating circuit is configured to vary a duty of the burst signal according to at least one of a temporal position of a drive period of the target-driving element and a frequency of the burst signal.

The drive circuit of the sixth configuration can also be configured as (a seventh configuration), wherein the burst generating circuit is configured to vary the duty according to the temporal position, and render the duty when the temporal position is a first position, to be smaller than the duty when the temporal position is a second position subsequent to the first position.

The drive circuit of the sixth or seventh configuration can also be configured as (an eighth configuration), wherein the burst generating circuit is configured to vary the duty according to the frequency of the burst signal, wherein the duty when the frequency of the burst signal is a seventh frequency, is made to be smaller than the duty when the frequency of the burst signal is an eighth frequency, wherein an impedance of the target-driving element, when the frequency of the burst signal is the seventh frequency, is less than an impedance of the target-driving element when the frequency of the burst signal is the eighth frequency.

According to another aspect of the present disclosure, a drive device is configured as (a ninth configuration), comprising:

a burst generating circuit (21), configured to generate a burst signal;

a drive circuit (A2), configured to generate a pulse drive signal based on the burst signal and supply the pulse drive signal to a target-driving element; and a power supply circuit (23), wherein the drive circuit uses a voltage supplied from the power supply circuit as a power supply voltage, and the burst generating circuit is configured to vary a duty of the burst signal according to at least one of a temporal position of a drive period of the target-driving element and a frequency of the burst signal.

The drive circuit of the ninth configuration can also be configured as (a tenth configuration), wherein the burst generating circuit is configured to vary the duty according to the temporal position, and render the duty when the temporal position is a first position, to be smaller than the duty when the temporal position is a second position subsequent to the first position.

The drive circuit of the ninth or tenth configuration can also be configured as (an eleventh configuration), wherein the burst generating circuit is configured to vary the duty according to the frequency of the burst signal, wherein the duty when the frequency of the burst signal is a first frequency, is made to be smaller than the duty when the frequency of the burst signal is a second frequency, wherein an impedance of the target-driving element, when the frequency of the burst signal is the first frequency, is less than an impedance of the target-driving element when the frequency of the burst signal is the second frequency.

An ultrasonic sensor (101, 102) of the present disclosure is configured as (a twelfth configuration), comprising:

a piezoelectric element (2, PZ1); and the drive device of any one of the first to eleventh configurations, configured to drive the piezoelectric element.

A vehicle (200) of the present disclosure comprises the ultrasonic sensor of the configuration above (a thirteenth configuration).

The invention claimed is:

1. A drive device, comprising:

a burst generating circuit, configured to generate a burst signal, wherein the burst signal comprises a plurality of first pulses transmitted consecutively and a plurality of second pulses transmitted consecutively, wherein plurality of first pulses and the plurality of second pulses have different frequencies; and a drive circuit, configured to generate a pulse drive signal based on the burst signal and supply the pulse drive signal to a target-driving element, wherein the pulse drive signal includes a first signal, corresponding to the plurality of first pulses, having a self-wave identification frequency and a second signal, corresponding to the plurality of second pulses, having a frequency other than the self-wave identification frequency.

2. The drive device of claim 1, wherein the drive circuit is configured to, when the frequency of the pulse drive signal is switched from a first frequency to a second frequency higher than the first frequency, switch from the first frequency to the second frequency after passing through a third frequency higher than the second frequency, and the frequency of the second signal is the third frequency.

3. The drive device of claim 1, wherein the drive circuit is configured to, when the frequency of the pulse drive signal is switched from a fourth frequency to a fifth frequency lower than the fourth frequency, switch from the fourth frequency to the fifth frequency after passing through a sixth frequency lower than the fifth frequency, and the frequency of the second signal is the sixth frequency.

4. The drive device of claim 1, wherein the drive circuit is configured to set a preliminary drive period for the target-driving element before a drive period of the target-driving element and render the frequency of the pulse drive signal at a beginning of the drive period to be different from the frequency of the pulse drive signal during the preliminary drive period, wherein the frequency of the second signal is the frequency of the pulse drive signal during the preliminary drive period.

5. The drive device of claim 1, wherein a number of pulses of the second signal is less than a number of pulses of the first signal.

6. The drive device of claim 1, further comprising a power supply circuit, wherein the drive circuit uses a voltage supplied from the power supply circuit as a power supply voltage, and the burst generating circuit is configured to vary a duty of the burst signal according to at least one of a temporal position of a drive period of the target-driving element and a frequency of the burst signal.

7. The drive device of claim 6, wherein the burst generating circuit is configured to vary the duty according to the temporal position, and render the duty when the temporal position is a first position, to be smaller than the duty when the temporal position is a second position subsequent to the first position.

8. The drive device of claim 6, wherein the burst generating circuit is configured to vary the duty according to the frequency of the burst signal, wherein the duty when the frequency of the burst signal is a seventh frequency, is made to be smaller than the duty when the frequency of the burst signal is an eighth frequency, wherein an impedance of the target-driving element, when the frequency of the burst signal is the seventh frequency, is less than an impedance of the target-driving element when the frequency of the burst signal is the eighth frequency.

9. An ultrasonic sensor, comprising:

a piezoelectric element; and the drive device of claim 1, configured to drive the piezoelectric element.

10. A vehicle, comprising the ultrasonic sensor of claim 9.

* * * * *